United States Patent Office 3,353,932
Patented Nov. 21, 1967

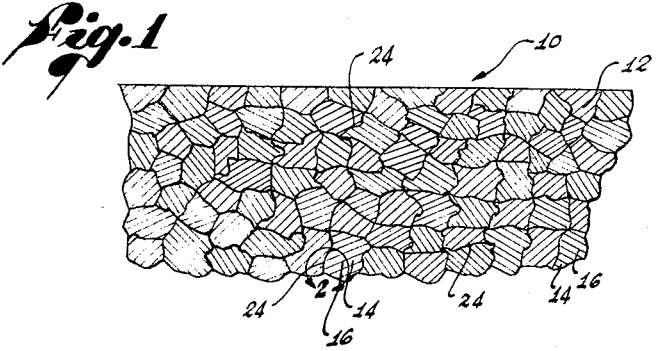
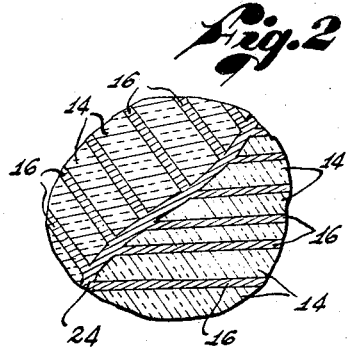
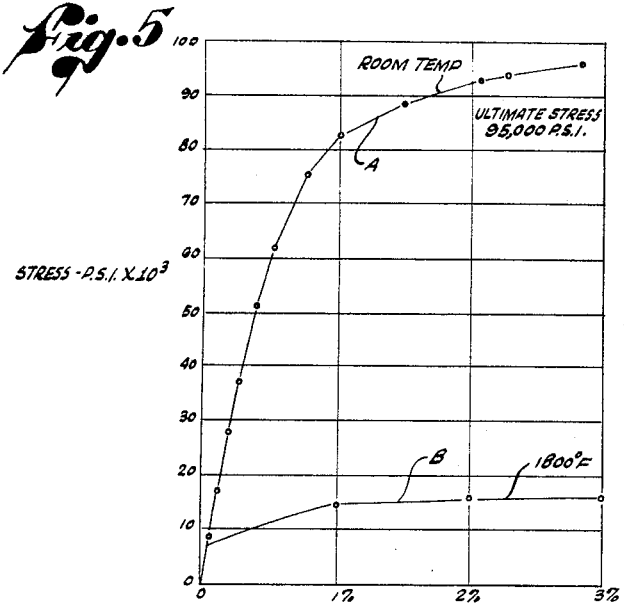
HOT PRESSED, STAINLESS STEEL-ALUMINUM OXIDE COMPOSITE MATERIAL
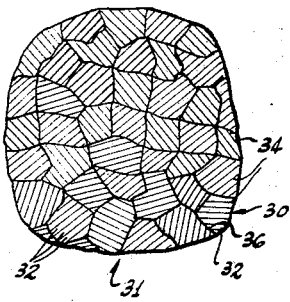
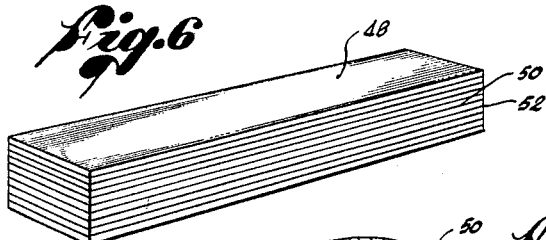
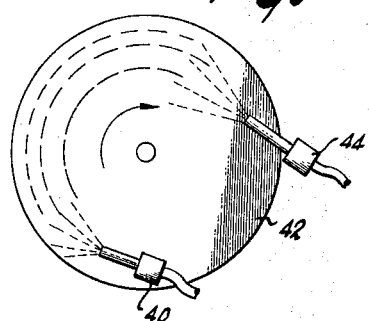
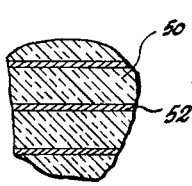
INVENTOR.
FRANCIS R. SHANLEY

3,353,932
COMPOSITE MATERIAL AND METHOD
FOR MAKING SAME
Francis R. Shanley, Los Angeles, Calif., assignor to The
Rand Corporation, Santa Monica, Calif., a non-profit
corporation of California
Filed Apr. 5, 1965, Ser. No. 449,360
37 Claims. (Cl. 29—182.2)

This application is a continuation in part of my copending application entitled Composite Material and Method for Making Same, filed July 9, 1959, and bearing Serial No. 825,978, now abandoned.

This invention relates generally to the production of ductile, composite materials, and relates more specifically to improvements in ductility of materials which are ordinarily brittle at room temperature, or at elevated temperature, so that these materials may be used structurally in flight structures, such as airframes, rocket engines and missiles, as well as in nuclear-powered devices, and as a structural material for general purposes.

The terms "ductility" and "brittleness" may be defined, for purposes of this patent application, as follows: when deformation of the crystal structure of a material is caused, as by tensile stress, and the amount of permanent deformation without fracture in the crystal structure is appreciable, the material is said to be ductile; when the permanent deformation taking place in the crystal structure, prior to fracture, is limited, the material is said to be brittle. Thus the amount of permanent (plastic) deformation of a material, without fracture, is generally a measure of ductility of the material.

The ductility of a material is greatly affected by its crystal structure. It is well established that ductility results, to a great extent, from "slip" of individual crystals on many closely spaced planes, these planes generally representing planes of the closest packing of atoms. There is also increasing realization of the extremely important role that may be played by surface conditions in the ductility behavior of both ductile and brittle materials.

At the present time there is not, to my knowledge, any material which retains its high strength at elevated temperatures, in the neighborhood of 3000° F. or higher, while possessing ductile characteristics, both at low temperatures, e.g. 50° F., and also at such high temperatures.

Ceramic materials have been studied for some years now, for use as a primary structural material because of their excellent high temperature properties, and because some ceramics are actually stronger than metals in compression. However, they have very little ductility at room temperature, that is to say, they are classified as brittle materials. At elevated temperatures, e.g. 2000° F., the brittleness in ceramic materials is somewhat reduced. However, to make practical structural use of such materials, their brittleness must be reduced very substantially, especially in the lower temperature regions.

Various metals such as beryllium, tungsten, etc. and their alloys have very advantageous strength properties at elevated temperatures (as opposed to common metal alloys such as stainless steel, aluminum, magnesium, titanium, etc. which become too soft, or even melt, at temperatures encountered in gas turbines, high speed aircraft, and missiles). However, beryllium, tungsten, and other high strength refractories are, at present, not practically usable in such high temperature environments because of their brittleness at nominal temperatures. Also the metal beryllium and the semi-metal boron have excellent potential for weight reduction in structures, yet because of their lack of ductility they are not readily utilized.

Glass is yet another material which is normally brittle, but which becomes ductile at elevated temperatures. However, glass is actually classified as an undercooled liquid (at room temperature) and undergoes continuous softening as the temperature is increased. At high temperatures glass is unsuitable because of its flow characteristics.

Prior attempts to overcome the brittleness of these above-mentioned materials have not met with too much success. For example, ceramic materials have been mixed with a less brittle metal to produce so-called "cermets." The lack of success of the cermets appears to be due to the fact that the metallic component has not been utilized in the best possible manner. Thus, if a ceramic body has many approximately spheroidal unconnected pieces of metal imbedded in it, any plastic deformation of the metal particles inherently requires a similar plastic deformation in the surrounding ceramic material, which is not possible at nominal temperatures. Thus the composite material behaves in a brittle manner. This will be true for any brittle material containing small unconnected ductile particles.

Conversely, if a composite material is made up largely from a ductile material (such as metal), in which small spheroidal particles of brittle material (such as ceramic) are imbedded, the composite material will not exhibit the desirable high temperature properties of the brittle (ceramic) material, i.e., it will have too much plastic deformation at high temperatures.

Attempts to improve the ductility of the high melting-point metals, such as tungsten or beryllium, have not been successful on a large scale. Various metallurgical treatments, heat treatments, hot or cold working have not produced the ductility required for general structural use.

Bearing in mind the foregoing facts, it is a major object of the present invention to provide a composite material in which one of the materials is brittle while another of the materials is relatively ductile, the brittle material being geometrically aligned relative to the ductile material so as to permit plastic deformation of the composite material to take place in any direction.

Another major object is to provide a composite material, the major amount of which is a normally brittle material, and the minor amount of which is a normally ductile material, the resulting physical properties of the composite material being substantially more ductile than the brittle material itself, while retaining a substantial part of the high-temperature strength of the brittle material.

A further object of the present invention is to provide plastic slip elements in a normally brittle material.

Still a further object of the present invention is to provide a composite material, composed of three dissimilar materials, one of the materials being hard or brittle; another being relatively ductile; and the third bonding the other two, the geometric arrangement of the brittle materials relative to the ductile materials being such as to permit substantial plastic deformation of the composite material to take place.

Certain advantageous phenomena are encountered in the behavior of very thin layers of materials. As in the case of very fine wires ("whiskers"), the properties of materials are strongly affected by extreme thinness of laminates. Another object, therefore, of the present invention is to provide a composite material having a plurality of very thin laminates of alternating materials which will exhibit improved properties as compared with the corresponding bulk material. For example, it may be possible to attain a higher melting point for the ductile component, by using very thin laminates.

It is, therefore, a further object of the present invention to provide a composite body of at least two dissimilar materials, one material being brittle, and having high strength at elevated temperatures, such as ceramics or high-strength refractory metals, while the other material (or materials) is relatively ductile, such as a ductile metal or alloy, the different materials of the composite being so aligned as to enable plastic slip to occur at room temperature, as well as at elevated temperature, under the application of shearing stresses, and to enable advantage to be taken of the favorable effects resulting from the use of very thin laminates.

It is also a further object of the present invention to provide a composite body of at least two dissimilar materials, one material being brittle, and having high strength at elevated temperatures, such as ceramics or high-strength refractory metals, while the other material (or materials) is relatively ductile, such as a ductile metal or alloy, the different materials of the composite being so aligned as to enable plastic slip to occur at room temperature, as well as at elevated temperature, under the application of shearing stresses, and to enable advantage to be taken of the ductility of the grain boundaries formed between the individual laminated particles.

Still another object of the present invention is to provide a composite body of one brittle and one ductile material, wherein the brittle material is permitted to slip, under the application of shearing stresses, and one or both materials themselves having enhanced strength characteristics by virtue of their geometric alignment in the composite structure.

Another object of the present invention is to provide various processes whereby my composite material can be produced.

These, and other objects of the invention, will become clearly understood by referring to the following description, and to the accompanying drawings, in which:

FIGURE 1 is a greatly enlarged cross-section of one embodiment of my invention;

FIGURE 2 is a further enlargement of a portion of the composite material shown by the curved arrow 2—2 in FIGURE 1;

FIGURE 3 is an enlargement of a cross-section of a second embodiment of my invention;

FIGURE 4 is a schematic representation of one type of apparatus for making the composite material of my invention;

FIGURE 5 shows stress-strain diagrams for a specific embodiment of the composite material of my invention;

FIGURE 6 is an enlarged perspective view of a unidirectional laminated composite material of my invention; and FIGURE 7 is a further enlargement of a portion of FIGURE 6.

In general, my invention comprises a mode of improving ductility of a first material by arranging a less brittle material, in a special microgeometric manner with relation to the first material.

As mentioned, in a brittle material, such as a ceramic, the amount of plastic slip of individual crystals along the many closely spaced planes within the material under application of shearing stresses (caused by a tensile or compressive stress) is negligible at room temperature. It has been discovered, however, that by utilization of a multiplicity of closely spaced thin planes of a more ductile material set within thin planes of a less ductile material, a composite unit having a "built-in" slip mechanism is produced. If then a composite material is formed, under sintering conditions, from a multiplicity of these composite units which are randomly oriented, and small relative to the composite material (e.g., one-thousandth to one-millionth the volume), it is found that the resulting material is ductile under all directions of loading.

The composite material of my invention requires, for its production, first the formation, as by vapor deposition, by electro-deposition, or by hot spraying, of many thin alternating layers of brittle and ductile material (which are thus bonded to each other), until a laminated body of desired thickness is built up. The laminated body, at this point, has increased ductility, with respect to the brittle material, in some directions but not in all directions. The laminated body is therefore crushed or comminuted into extremely small particles, which particles retain a plurality of the laminations. Thus, if alternating ductile and brittle layers of about 0.002" in thickness are laid down, and 250 such layers are deposited, a ½" thickness is built up. During comminution, the pseudo-crystals may have somewhere between 10–200 laminations and may have a mesh size ranging between about 4 to 100 mesh (by way of example).

These very small particles, units or pseudo-crystals are then bonded or sintered in random fashion, as with an ordinary powdered material, perhaps at elevated temperature, and at high pressure, in the desired structural shape. More specifically, the pseudo-crystals once formed, are randomly assembled in a mold or die, and then bonded or sintered together, generally under pressures of between about 1000 p.s.i. to about 5000 p.s.i., and at temperatures of the order of between about 600° C. and 2000° C., the exact temperature pressure utilized depending, primarily, upon the particular materials forming the pseudo-crystals. In general, the higher the pressure the lower the temperature requirement; the temperature is preferably kept as low as possible, and preferably below the melting point of the ductile component, to minimize diffusion.

During sintering of the random pseudo-crystals, under high pressure as aforedescribed, the more ductile material (e.g. the metal in metal-ceramic pseudo-crystals) will flow out, or diffuse, from between the brittle layers in the pseudo-crystals and will fill the gaps between adjacent pseudo-crystals and thereby form a generally continuous band of the more ductile material around the more brittle component of the composite material. The formation of this generally continuous band of the more ductile material is a highly important feature of this invention, and will be generally referred to herein, and in the claims, as a "grain boundary" since it forms a boundary between adjacent pseudo-crystals or grains. The relatively ductile grain boundary enables a pseudo-crystal, itself, to have a slight amount of rotation with respect to its neighbors and thus effectively provides a set of slip planes whereby the composite material, as a whole, can be deemed to be ductile, when subjected to multi-directional stresses.

As an illustration of the ductility obtained in my composite, a 65% alumina-35% stainless steel composite, formed in accordance with the foregoing, has a ductility of about 3% at room temperature and about 5% at 1800° F.; a 40% alumina-60% stainless steel composite has a ductility of the order of 15% at room temperature. Alumina has no plastic deformation, i.e. no ductility, at room temperature or at 1800° F.

Thus, the resulting material is a composite material composed of relatively small pseudo-crystal units in each of which units there are many closely spaced thin parallel planes of metal, these units being arranged in more or less random orientation and surrounded by grain boundaries of ductile material. The volume of the pseudo-crystal units is generally of the order of one-one thousandth ($10^{-3}$), one-one hundred-thousandth ($10^{-5}$), one millionth ($10^{-6}$) or less with respect to the volume of the resulting composite material. Usually, the volume of a pseudo-crystal to the final volume of resulting composite will be less than 1%, and, in most applications will be less than 0.1%.

It will be seen that in addition to the highly advantageous mechanism for plastic or inelastic deformation (by means of slip) provided by the thin planes of the ductile component within the pseudo-crystal, the ductile behaviour of the brittle components is also enhanced by creating conditions at the surfaces of the brittle component that favor slip, rather than fracture. The large ratio of surface to volume, for the thin laminates, is believed to be conducive to high strength and this, coupled with the formation of ductile grain boundaries, and further coupled with the pseudo-crystal, aforedescribed, results in a high strength, yet ductile material.

Referring now especially to FIGURE 1 and 2, the internal structure of one embodiment of my novel composite material 10 is shown. The units or pseudo-crystals 12 of my composite material are shown in greatly enlarged form for purposes of illustration. The pseudo-crystals 12, however, may be on the order of thousandths, hundredths, or tenths of an inch in thickness, length, and/or width with respect to the final composite material 10.

Each pseudo-crystal 12 of the composite material is composed of a series of laminated thin, flat, parallel planes of alternating brittle and ductile material, 14 and 16 respectively, which planes are bonded to each other.

In the FIGURES 1 and 2 embodiment, the brittle material 14 represents a ceramic material while the ductile material 16 represents one of the ductile metals. For purposes of this application, a ceramic material may be defined as a material containing phases which are compounds of metallic and non-metallic elements. A ceramic material is commonly an amorphous or crystalline material made from, or derived from clays, usually by a firing or baking process, and those materials derived from silicates known commonly as glass. The ceramic materials thus include metal carbides, cemented carbides, metal nitrides, metal silicides, metal oxides, and metal silicates. Typical ceramic materials are alumina ($Al_2O_3$), beryllia (BeO), magnesia (MgO), building brick, forsterite ($MgSiO_3$), mullite porcelain, steatite porcelain, zircon porcelain, and sewer pipe (vitrified clay). Graphite (carbon) is also included, for purposes of this application, as a ceramic, as well as hafnia ($HfO_2$) or zirconia ($ZrO_2$).

The ceramic material 14 is utilized in the embodiment shown by FIGURE 1 is, for example, alumina while the more ductile metal, employed as the ductile material 16, is, for example, stainless steel. Many other ductile materials may be employed so long as they are chemically inert with respect to the brittle component. Other additional ductile metals are iron, brass, silver, copper, chromium, aluminum and various alloys of these metals.

Among other classes of ductile materials usuable in the preparation of the pseudo-crystals 12 are any one of the numerous plastic compounds, e.g., those of the polyvinyl, phenolic, urea-formaldehyde, polystyrene, methyl methacrylate, nylon, cellulose derivative, and epoxy type. Also, organic materials such as wood, paper, etc., can be employed as the ductile component. However, for high-temperature applications, the use of ductile metals, to provide the slip mechanism, is preferred.

The relative proportions of the materials in the pseudo-crystals is a matter dictated by the use to be made of the composite material 10. For example, for high-temperature applications, the majority of the material would probably be the ceramic material. For lower temperature applications, the ceramic material may be present in amounts less than 50%. In studying and analyzing the behavior of the pseudo-crystals 12, it is believed that the ceramic planes of material slide or slip over each other under the application of shearing stresses, by means of the slipping qualities provided by the thin metallic planes of material 16. Further, very thin layers of ceramic, if they are permitted to slide over each other, are found to be bendable without fracturing. Thus, the pseudo-crystals 12 can adjust their individual shapes to provide for continuity of inelastic deformation.

Additional advantages are believed to arise from the geometry of the pseudo-crystal 12 because of the fact that very thin ribbons or sheets of material have strength properties greatly superior to those for bodies of normal size. For example, in the case of fine wires of micron thicknesses ultimate tensile stresses of the order of $10^6$ pounds per square inch have been attained. In the case of fine glass fibers, values of over one-half million p.s.i. have been obtained. These values compare with "normal" ultimate tensile strengths of $10^5$ p.s.i. for metals and much less for glass or other ceramics.

In the pseudo-crystals 12 of my invention, strength increases over the normal are applicable for probably the same reason. While the use of laminations in composite materials is not in itself novel (e.g. safety glass), the use of much thinner laminations than have been utilized heretofore does give rise to superior strength properties for the composite material. In particular, brittle materials will generally exhibit much higher tensile strength and elongation when fabricated in very thin sheets. Therefore, the combination of relatively ductile and brittle materials in the form of very thin laminations provides sufficient strength and elongation for certain types of structures.

It is preferable that, in order to attain these increased strength characteristics, the laminations within each pseudo-crystal be less than 0.001 inch in average thickness. It will, of course, be understood that the laminations may be of greater thickness, if increased strength characteristics, due to extreme thinness, are not desired, while still retaining for the composite material, a greater overall ductility.

An important feature of my invention is the breaking up of the above-described laminated material into small particles 12 ("pseudo-crystals") and the use of these particles as a base material from which structural parts are fabricated by a sintering or bonding process.

The primary reason for using the laminated material in the form of small pseudo-crystals is that these pseudo-crystals can be randomly oriented to provide approximately equal ductility in all directions. Ductility is provided by slip under shearing stresses. A single pseudo-crystal will deform by slip only when loaded by shearing stresses in the planes of the ductile layers. An analogy can be made to the deformation of a pack of playing cards. However, if the pseudo-crystals are allowed to take on random orientations in the manufactured part, there will be slip under any type of loading which produces internal shearing stresses.

The action of the randomly oriented pseudo-crystals of this invention resembles those of the real crystals of a ductile material, and just as a real crystal usually contains several sets of slip planes oriented in different directions, the randomly oriented pseudo-crystals, held between ductile grain boundaries has a multiple number of slip planes in all directions.

Thus, the composite material 10, formed from the pseudo-crystals 12 and randomly oriented as shown in FIGURE 1, has approximately equal ductility in all directions.

The processes by which the composite material 10, is made is described hereafter. However, all the processes provide that a grain boundary, between adjacent pseudo-crystals, is formed by the relatively ductile material.

The juncture or grain boundary 24 of two adjacent pseudo-crystals 12 is shown in FIGURE 2, in greatly enlarged fashion. This juncture or boundary 24 between the pseudo-crystals is composed of a ductile metal component, and it is to be noted that all the adjoining metallic planes 16 are bonded thereto. As mentioned, the overall ductility of the composite material is believed to be greatly enhanced by such a geometric configuration, in particular because it provides for relative slip or rotation between pseudo-crystals. Thus while the pseudo-crystals should each be provided with several different sets of slip planes, this is not found to be actually necessary when the pseudo-crystal is capable of a slight amount of plastic rotation with respect to its neighbors, this phenomenon being provided by the grain-boundary 24 of ductile material which forms during the sintering or bonding process and which provides the bond between pseudo-crystals. If necessary, additional ductile material in the form of powder can be employed during the sintering or bonding process in order to ensure the formation of ductile grain-boundaries.

It will be seen that the present invention employs laminations of material in several distinct ways, each of which, separately, has certain advantages, and when combined, cooperate in a highly advantageous manner to give increased strength with ductility.

Turning now to FIGURE 3, a cross-sectional enlargement of a second embodiment of my invention is shown. In this embodiment, each pseudo-crystal 30 of this composite material 31 is composed of alternating bonded layers of a metal such as beryllium 32 (which has high-strength but is brittle) and a much more ductile metal, e.g. copper 34. A similar random arrangement of closely spaced pseudo-crystals 30 exists in the metal-metal composite material, as exists for the ceramic-metal composite. The ductile material comprises the boundary layer 36, as in the ceramic-metal composite, and the relative thicknesses of the lamina are determined by the physical properties desired of the composite material. For example, in order to retain the advantages of the low density of beryllium in the composite material, it is desirable to keep the amount of the second component material to a minimum e.g. 15% of the total weight of the composite. Also, the lamina thickness of the ductile material will depend, to some extent, on the surface conditions achieved at the lamina interfaces, and the extent to which plastic deformation is to take place in the composite 30.

The same advantages of random orientation of the pseudo-crystals 30 and of the ductile boundary layers 36 are present in this composite 31, as in the composite material 10. That is to say, the ductile behavoir of the beryllium component appears to be enhanced by creating conditions at the surfaces of the beryllium layers that favor slip rather than fracture, and secondly, the composite material 30 is provided with a mechanism for plastic deformation through slip within the ductile copper layer.

Other ductile metal components may be used for other composite materials such as aluminum, iron or magnesium, in combination with beryllium, molybdenum or other brittle metal components, or semi-metal components such as boron, the geometric configuration of these composites being very similar to that shown in FIGURE 3.

Many other combinations of materials may also be selected having the geometric configurations shown and described with reference to FIGURES 1, 2 and 3. Among these composite materials are the combination of high-strength brittle metals and plastic, and the combination of organic material (such as wood) with a metal. Thus, a wood-metal laminate could be made, cut into small pseudo-crystals, and then bonded together with a suitable binder to form a composite material for some low-temperature applications. Also, systems of tungsten-silver composites, boron-silver composites, beryllium-aluminum composites constructed as described are especially advantageous where high strength, with low weight, ductility, and resistance to high temperatures are required. The composites just mentioned would make excellent spacecraft and aircraft structural materials.

The first step in a process for making any of the aforedescribed composite materials is the formation of many thin (e.g. 0.002 inch or less) flat alternating layers of brittle and ductile material. Among those methods proposed for formation of the alternating layers, a suitable process involves the hot spraying of the alternating materials in the molten or semi-molten form onto a suitable collector.

Referring to FIGURE 4, a schematic representation of a suitable apparatus is shown. A spray gun 40 "hot sprays" a layer of the ductile material (e.g. copper) onto a rotating disc 42 over a particular area thereof. An instant later, the second spray gun hot sprays the molten brittle material (e.g. alumina or beryllium) over the same area previously sprayed by gun 40. The rotation of the disc is shown clockwise. In this manner, a series of alternating bonded layers can readily be built up of desired relative thickness, as well as desired overall thickness.

The more brittle component of the composite may comprise anywhere from 15% to 85% of the volume of the final composite depending upon the degree of ductility desired, temperature resistance desired, as well as other factors. Thus, the thicknesses of layers or planes of the more brittle material may be a fraction (e.g. 15/85 or about 0.18 times) of the more ductile plane of material or may be many times (e.g. 85/15 or 5.67 times) that of the more ductile plane of material.

The alternating bonded layers can also be built up in other ways such as, by vapor phase deposition, diffusion welding, or by electrodeposition. Thicknesses of as little as 10 microns can be deposited by these techniques. For example, the alternate layers of brittle and ductile materials can be electro-deposited onto a rotating drum or disc. In some cases, the laminate can be formed initially, by simply manually assembling alternate thin layers of the desired brittle and ductile materials. In this case, the layers would have to be bonded together as by heat and/or pressure, or by a separate bonding material such as epoxy resin, in order to form the laminate. Reference is here made to Patent No. 3,089,196 wherein several methods of forming the laminate and final composite material are described.

(In FIGURES 6 and 7 the unidirectional laminate resulting from the assembly and bonding of alternate layers of material is shown. Such a unidirectional laminate does not have similar ductility in all directions but is useful in certain applications where uniaxial stresses are primarily encountered.)

The laminate is then comminuted or broken up into small particles or pseudo-crystals, the size of which is roughly on the order of 10–200 times the average thickness of a layer in the laminations. The pseudocrystals have a mesh size generally ranging from 4 to 100 mesh depending mainly on the number of laminations desired per pseudo-crystal. The comminution means should not cause delamination to any greater extent. A suitable mechanical method employs a crushing operation in a ball mill. Another method utilizes a punch or projector on a rapidly revolving wheel, to which the material is fed.

The final steps involve assembling the small particles or pseudo-crystals in a closely spaced random orientation, in an appropriate mold of desired configuration, and bonding them together. If metal is employed as one component of the composite material, a sintering process (involving heat and pressure) presently appears most suitable although additional bonding agents may be employed. As mentioned previously, the sintering conditions can vary widely, between about 1000–5000 p.s.i. and between about 600° C.–2000° C. depending upon the particular materials forming the pseudo-crystals. Under such conditions, the ductile grain boundaries are formed between closely spaced pseudo-crystals, as previously described in some detail.

Additionally, it will be realized because the pseudo-crystals are retained within a mold or die, under high pressure, there is a limit to how much metal can be squeezed out from within the individual pseudo-crystals. As a practical matter, it is impossible to squeeze out all of the ductile material from between the layers of more brittle material because, as the thickness of the ductile layer decreases, more and more pressure is required in order to cause a flow-out, and this pressure becomes enormous as the ductile layer becomes very thin.

Also, it is readily within the skill of the art to make the ductile layers initially sufficiently thick so that, under the particular sintering conditions chosen, ductile material of a certain predetermined amount will be retained within the laminate of each of the individual pseudo-crystals to thereby provide slip within the individual pseudo-crystals themselves while, at the same time, forming a grain boundary between adjacent pseudo-crystals.

Further, if a grain boundary having further ductile material is desired, it is also well within the skill of the art, to introduce a ductile material, in powder or liquid form, into a mold or die containing randomly oriented pseudo-crystals, and sinter the whole. In this way, the added ductile material will be admixed with the ductile material from the laminate, to thereby provide additional ductile material within the grain boundaries.

If a plastic is employed as one component layer, the final bonding process most suitably involves a bonding by means of a thermosetting liquid plastic such as an epoxy resin.

The resulting composite material or article is composed of small integrally bound closely spaced pseudo-crystals, in each of which there are many closely spaced thin alternating parallel planes of ductile material and brittle material, these crystals being arranged in generally random orientation, and bonded together by ductile grain boundaries, as previously described. Such random orientation in the resulting composite material gives rise to an equal ductility in all directions, this property being especially suitable for use in articles made therefrom subjected to multiaxial tension, such as pressure vessels.

Referring now to FIGURE 5, a compression stress-strain diagram is shown for an alumina-stainless steel composite material, produced in accordance with the foregoing principles of my invention. The aluminum oxide content, by volume, was approximately 72%, and by weight, was 53%. It should be noted that curve A (stress vs. strain at room temperature) curves to the right, i.e. the composite material underwent very substantial elongation, and withstood very substantial compressive loading prior to fracture. In short, the alumina composite material behaved in a ductile manner.

Curve B shows the stress-strain diagram for the same composite material, at 1800° F. The deformation of the material is, as can be seen, very substantial.

The alumina-stainless steel composite material was made by the process described above, utilizing specifically the hot spray method for forming the initial laminate.

Examples of my invention follow:

*Example 1*

Sheets of alumina are rolled to a thickness of less than 0.030 inch and fired. The ductile component is a copper-silver eutectic alloy (28% copper) in the form of sheets of about 0.002 inch in thickness, or less. Alternating sheets of alumina 50 and ductile metal 52 are assembled manually to a desired thickness of, for example, one-half inch. The composite is then heated to a temperature of 1450° F. to obtain a brazing action.

The composite is then generally further processed, by comminution to about 10 mesh and sintering to cause diffusion of the more ductile metal component to thereby provide the grain boundaries of the ductile metal component heretofore described. Sintering should take place at a temperature and pressure sufficient to cause bonding. The higher the temperature, the lower the pressure required. Typical requirements in this system called for the use of 2000 p.s.i. and 750° C.

Further examples of ceramic-metal, and metal-metal composites of my invention are set forth below:

*Example 2.—Aluminum oxide-stainless steel*

PREPARATION OF THE FINELY-LAMINATED MATERIAL

A one-half inch thickness of finely-laminated material, comprised of aluminum oxide and stainless steel, was prepared by directing sprays from a ceramic flame-spray gun and a metallizing flame-spray gun onto a rotating steel collector plate. The two spray guns were operated simultaneously, and were directed so that the spray from each gun fell upon a separate area of the rotating collector plate. (See FIG. 4.) This arrangement allowed for the deposition of the alumina component in a thin layer of about 0.0018 inch followed immediately by the deposition of a thin layer (0.001 inch) of the stainless steel component, and so on. The relative rates of deposition of the two guns were controlled so that the laminate so formed contained 65% ceramic and 35% metal (on a volume basis).

The aluminum oxide component is introduced into the flame-spray gun as a powder, screened to give particles ranging from about 250 mesh to 375 mesh (standard Tyler sieve sizes). This material is prefused, and it was of a purity of 99% $Al_2O_3$ or better. The stainless steel is introduced into the flame-spray gun in wire form. Typical analysis of this material is 18–20% Co, 8–10% Ni, 2% Mn, 0.75% Si, 0.03% S, and the balance Fe. These materials bond to each, upon deposition, without the need for any third adhesive component because of the molten nature of these materials at the time of deposition.

FORMATION OF SMALL PSEUDO-CRYSTALS OF THE MATERIAL

After building up 0.6 inch of finely-laminated material, the laminate is cooled, removed from the collector surface and then is broken up into granules, or "pseudo-crystals" by means of a jaw crusher or other size reduction device. The granulated material is screened, and pseudo-crystals ranging from 6 to 20 mesh sieve sizes were retained for further fabrication. The number of laminations per pseudo-crystal ranged from about 35 to 120.

SINTERING UNDER PRESSURE

The granules ("pseudo-crystals"), prepared as described above, were randomly charged into a graphite mold, and were sintered under pressure in a hot press. The interior dimensions of the mold were ½″ x ½″ x 1″ long, and the average pseudo-crystal volume occupied about 0.8% of the total of the composite article formed. The following schedule was followed: the mold (containing the charge) is heated to 1250° C. in about two hours, and the pressing load then is applied to give a pressure of 2500 lbs./sq. in. The pressure is maintained for about 1 hour while holding the temperature at 1250° C.; following this, the charge is allowed to cool under pressure. It is desirable to purge the mold and charge with an inert gas during high temperature operations.

CHARACTERISTICS OF THE COMPOSITE MATERIAL

Samples of aluminum oxide-stainless steel composite materials, prepared as described above, were tested to determine certain mechanical properties at room temperature and at about 1000° C. The material possessed a measurable degree of ductility both at room temperature and at 1000° C. At room temperature the plastic deformation (in compression loading) of the composite was 2½% its original length; at 1000° C., the deformation was 3%. There is no measurable plastic deformation of the alumina at either room temperature or at 1000° C. The compressive strength of the composite at room temperature was about 95,000 lbs./sq. in.

Samples of 40% aluminum oxide-60% stainless steel, prepared as described herein, possessed a ductility of 15% at room temperature.

*Example 3.—Aluminum oxide-nickel*

PREPARATION OF THE FINELY-LAMINATED MATERIAL

The preparation of the finely-laminated material is achieved by the same procedure described for Example 2 except that a 60% alumina-40% nickel laminate is made. The nickel component was introduced into the flame-spray gun in powder form (screened to give particles ranging from about 250 to 375 mesh sieve size). (The nickel component may also be introduced into the spray gun in wire form.) Purity of the nickel is 99% or greater.

FORMATION OF SMALL PSEUDO-CRYSTALS OF THE MATERIAL

This step is carried out in the manner described in Example 2.

SINTERING UNDER PRESSURE

The procedure described for Example 2 is followed. The mold and charge are heated to 1250–1290° C. in about two hours, and a load producing a pressure of 2500 p.s.i. is applied. The charge is held at 1250–1290° C., and under a pressure of 2500 p.s.i., for 1 hour. The charge then is allowed to cool to room temperature while the pressure is maintained.

CHARACTERISTICS OF THE COMPOSITE MATERIAL

Samples of aluminum oxide-nickel composites were made as described in Example 2 and possessed limited ductility at room temperature and satisfactory mechanical strength. The plastic deformation of the composite, at room temperature, was 5%.

Example 4.—Aluminum oxide-aluminum

PREPARATION OF THE FINELY-LAMINATED MATERIAL

The same procedure for preparation is followed as described in Example 2. The aluminum metal is introduced into the flame spray gun in wire form, and is of 99% purity or better. A 75% alumina-25% aluminum composite is formed.

FORMATION OF SMALL PSEUDO-CRYSTALS OF THE MATERIAL

This step is accomplished as described in Example 2. Some difficulty may be experienced in forming granules with this composite material, since the metal phase possesses great ductility, and the material tends to be deformed, rather than fractured, in the jaw crusher. Reducing the temperature of the laminate (with Dry Ice, etc.), prior to the granulation step, is therefore desirable.

SINTERING UNDER PRESSURE

This procedure is carried out as described in Example 2, excepting that the temperature of the charge and mold is increased to 600° C., only in one to two hours, and the load producing a pressure of 2500 lbs./sq. in. then is applied. As in previous examples, the charge is held at maximum temperature, under pressure, for 1 hour, and allowed to cool (under pressure).

CHARACTERISTICS OF THE COMPOSITE MATERIAL

A material possessing some ductility at room-temperature on the order of that of Example 3 is the result of the fabrication just described.

Example 5.—Aluminum oxide-copper

PREPARATION OF THE FINELY-LAMINATED MATERIAL

The procedure for preparation is essentially the same as described in Example 2. The copper metal is introduced to the flame-spray gun in wire form and is of a purity of 99% or better. The laminate comprises about 65% alumina and 35% copper.

FORMATION OF SMALL GRANULES OF THE MATERIAL

The method used is the same as described in Example 2.

SINTERING UNDER PRESSURE

The sintering step is that described for the previous Example 2 except that the maximum temperature of sintering for an alumina-copper composite is about 1000–1050° C.

CHARACTERISTICS OF THE COMPOSITE MATERIAL

The finely-laminated composite materials showed very good ductility at room temperature, i.e. 5% or greater plastic deformation.

Example 6.—Aluminum oxide-brass

PREPARATION OF THE FINELY-LAMINATED MATERIAL

A finely-laminated composite of 50% alumina and 50% brass is prepared by the same procedure described in Example 2. The brass is introduced into the flame-spray gun in wire form.

FORMATION OF SMALL GRANULES OF THE MATERIAL

The method used is that described in Example 2.

SINTERING UNDER PRESSURE

The sintering procedure is the same as described in Example 2 excepting that the maximum temperature employed is about 940° C.

CHARACTERISTICS OF THE COMPOSITE MATERIAL

The composite material was placed in a furnace at 2410° F. (about 1218° C.), to determine the effects of high temperature. The composite did not deteriorate. The composite also has measurable ductility at room temperature.

Example 7.—Beryllium-aluminum

Two mil sheets of substantially pure beryllium are stacked with 1 mil sheets of aluminum (99%+ purity) to a total thickness of 0.5 inch. The assembly is then diffusion welded at about 1100° F. and under a pressure of about 2000 p.s.i.

The resulting laminated material is then broken up as described in Example 2 and mesh sizes of between 15–20 mesh are employed for the formation of the composite. The laminations per pseudo-crystal are about 30 to 40 on the average.

The pseudo-crystals so formed, are placed in a mold, as described in Example 2, and a high pressure of 3000 p.s.i. and a temperature of about 1100° F., is employed to bond the pseudo-crystals together.

The ductility, at room temperature, of the sample obtained (one pseudo-crystal occupies, on the average, about 1% of the sample) was about equal to the ductility of 7075 aluminum, T6 temperature (ASTM designation).

Example 8.—Nickel-stainless steel

A 75% nickel (of 99%+ purity)-25% stainless steel (of composition as specified in Example 2) composite is prepared as set forth in Example 7, except that the temperature, of diffusion-welding and sintering, takes place at about 1200° C., and the sheets of nickel and stainless are 3 mils and 1 mil respectively. Nickel is the relatively brittle component.

The ductility of the sample obtained was substantially more ductile than the nickel itself, at room temperature and at 1000° C. and is of the same order of magnitude of Example 2.

Example 9—Molybdenum-titanium

A 20% molybdenum-80% titanium composite is prepared as set forth in Example 7, except that the temperature, of diffusion-welding and sintering, takes place at about 1700° C. just below the melting point of titanium and the sheets of molybdenum and titanium are 1 mil and 4 mils respectively. Both the molybdenum and titanium are 99+% pure.

The ductility of the molybdenum is greatly improved over that of the pure molybdenum.

Example 10

A polyethylene film, 0.0005 inch in thickness (manufactured by Dow Chemical Co. under the trademark "Handy Wrap"), was coated with a standard polyester resin, curing agent system approximately 0.005 inch in thickness, said polyester resin being substantially more brittle, upon curing, than said polyethylene film. Alternating laminations of polyethylene film and more brittle polyester resin were built up until a laminate of 20 bonded layers was produced. Curing of the laminate occurred at room temperature and atmospheric pressure.

After curing of the laminate, the laminate was comminuted into particles or pseudo-crystals approximately 0.10″ x 0.45″ x 0.15″. The pseudo-crystals were then randomly assembled in bars and bonded together by means of additional polyester resin. The finished bar dimensions were 2.8" x 0.84" x 0.67".

Several such bars were made and were then compressed under a measured pressure; the deformation and point of failure were observed. (An Instron machine was employed.) It was observed that the bars, on the average, developed a maximum compressive stress at about 2300 p.s.i. and that no brittle failure occurred.

It is thus seen that a randomly-laminated specimen formed from two different plastic materials, one ductile and the other substantially more brittle, in accordance with the principles of this invention does not fail in a brittle manner, in compression, even though about 90% of the volume, of the bar, is composed of the substantially more brittle material.

It may be desirable (in the initial step of forming certain metal-metal laminates, or metal-ceramic laminates) to bond these laminates together without going up to temperatures at which extensive diffusion of a metal component may occur. It may therefore sometimes be advantageous to introduce minor amounts of a third component e.g. an adhesive such as an epoxy resin, to enhance the bonding of the laminates, minimize diffusion, and also to possibly affect the surface properties of each of the layers of material in the laminate. This third component can also be added in the final step of the process, that is, can be introduced into the mass of pseudo-crystals, and enhance the crystal bonding, and surface and boundary effects, while minimizing diffusion tendencies.

It will be understood that the volume of the pseudo-crystals relative to the final product will vary greatly for many reasons. The pseudo-crystals may be used to form, tool bits, or nose cones for missiles or space vehicles, for example. It can only be stated that the volume of pseudo-crystals will generally always be less than about 1% of the volume of the finished product in which it is contained and will, in most instances, be even substantially smaller in volume percentage than 1%.

It will be further understood, that there will generally be 10-200 laminations, i.e. 10-200 bonded planes of alternating ductile and brittle material, per pseudo-crystal, and the pseudo-crystals are generally comminuted to a mesh size such that the desired number of laminations are present. Also, where the thickness of the layer is very small, e.g. 10 to 1000 microns, the laminations per pseudo-crystal will normally increase considerably, e.g. to as high as 100,000 laminations. The size of the pseudo-crystal, in general, lies in the range of about 4-100 mesh, as previously mentioned, but may be smaller, if desired.

While several embodiments of my composite material, and process for making it, have been shown and described, it will be understood that changes and modifications may be made that lie within the skill of workers in the art, and lie within the scope of my invention. Hence, I intend to be limited in the scope of my invention, only by the claims, which follow.

I claim:
1. A composite article which comprises:
    a multiplicity of closely spaced pseudo-crystals generally randomly oriented with respect to each other, each of said pseudo-crystals comprising less than about 1% of the total volume of the composite article and comprising a plurality of bonded planes of alternating materials, each plane of material being generally parallel to the other within each of said pseudo-crystals, and one plane of material being composed of a relatively brittle material and the adjacent plane of alternating material being composed of a more ductile material;
    and said more ductile material occupying the spaces between said pseudo-crystals and bonding said pseudo-crystals together, whereby the composite article is substantially more ductile than said relatively brittle material.

2. The article of claim 1 wherein said pseudo-crystals have from between about 10 to about 200 alternating bonded planes of relatively brittle and more ductile material.

3. The article of claim 1 wherein said bonded planes of material in each pseudo-crystal have thicknesses ranging from between about 10 microns to about 2 mils.

4. The article of claim 1 wherein the relatively brittle material comprises between about 15% to about 85% of the total volume of said composite article.

5. The article of claim 1 wherein an adhesive material is present between adjacent planes of said alternating materials.

6. A composite article which comprises:
    a multiplicity of closely spaced pseudo-crystals generally randomly oriented with respect to each other, each of said pseudo-crystals comprising less than about 1% of the total volume of the composite article and including a plurality of bonded planes of alternating materials, each plane of material being generally parallel to the other within each of said pseudo-crystals, and one plane of material being composed of a ceramic material and the adjacent plane of alternating material being composed of a more ductile material;
    and said more ductile material occupying the spaces between said pseudo-crystals and bonding said pseudo-crystals together, whereby the composite article is substantially more ductile than said relatively brittle material.

7. A composite article which comprises:
    a multiplicity of closely spaced pseudo-crystals generally randomly oriented with respect to each other, each of said pseudo-crystals comprising less than about 1% of the total volume of the composite article and being composed of a plurality of pairs of bonded planes of dissimilar material, each plane of material being generally parallel to the other within each of said pseudo-crystals, and one plane of material within each of said pairs being composed of a relatively brittle metal material and the other plane of material of said pair being composed of a more ductile metal material;
    and said more ductile metal material occupying the spaces between said pseudo-crystals and bonding said pseudo-crystals together, whereby the composite article is substantially more ductile than said relatively brittle material.

8. A composite ceramic-metal article which comprises:
    a multiplicity of closely spaced pseudo-crystals generally randomly oriented with respect to each other, each of said pseudo-crystals comprising less than about 1% of the total volume of the composite article and being composed of a plurality of pairs of bonded planes, of dissimilar material, each plane of material being generally parallel to the other within each of said pseudo-crystals, and one plane of material within each of said pairs being composed of a ceramic material and the other plane of material of said pair being composed of a more ductile metal material;
    and said more ductile metal material occupying the spaces between said pseudo-crystals and bonding said pseudo-crystals together, whereby the composite article is substantially more ductile than said relatively brittle material.

9. A composite ceramic-metal article which comprises:
    a multiplicity of closely spaced pseudo-crystals generally randomly oriented wtih respect to each other, each of said pseudo-crystals comprising less than about 1% of the total volume of the composite article and including between about 10 to about 200 bonded planes of alternating material, each plane of material being generally parallel to the other within each of said pseudo-crystals, and one plane of material being composed of a ceramic material having a thickness of between about 10 microns and 2 mils and the other plane of alternating material being composed of a more ductile metal material and having a thickness of between about 10 microns and 2 mils;

and said more ductile metal material occupying the spaces between said pseudo-crystals and bonding said pseudo-crystals together, whereby the composite article is substantially more ductile than said relatively brittle material.

10. The article of claim 9 wherein said plane of material composed of a ceramic material comprises between about 15% to about 85% of the total volume of said article.

11. A process for making a composite article which consists essentially of:
depositing a multiplicity of thin layers of a ductile and a brittle material upon each other, in alternation, and bonding said layers of ductile and brittle material together to form a laminated body;
comminuting said laminated body into particles having a volume of less than about 1% of the volume of the composite article to be made, each of said particles retaining a plurality of laminations therein;
arranging said particles in closely spaced relationship, and in random orientation;
and bonding said particles in said random arrangement with a material more ductile than said brittle material, whereby the composite article is substantially more ductile than said relatively brittle material.

12. The process of claim 11 wherein said thin layers of ductile and brittle material each have a thickness of between about 10 microns and 2 mils.

13. The process of claim 11 wherein said thin layers of ductile and brittle material are generally parallel to each other.

14. The process of claim 11 wherein each of said particles have between about 10 to about 200 alternating layers of said brittle and said ductile material.

15. The process of claim 11 wherein said layer of brittle material comprises between about 15% to about 85% of the total volume of said composite article.

16. The process of claim 11 wherein said particles are bonded in random orientation under sufficient pressure and at an elevated temperature such that said ductile material in each of closely spaced said particles fills the spaces between said particles and causes bonding thereof.

17. The process of claim 16 wherein said particles are bonded in random orientation at temperatures of between about 600° C. to about 2000° C. and at pressures of between 1000 p.s.i. and 5000 p.s.i.

18. A process for making a composite article which consists essentially of:
depositing a multiplicity of thin layers of a relatively brittle ceramic and a more ductile material upon each other, in alternation, and bonding said layers of relatively brittle and more ductile material together to form a laminated body;
comminuting said laminated body into particles having a volume of less than about 1% of the volume of the composite article to be made, each of said particles retaining a plurality of laminations therein;
arranging said particles in closely spaced relationship, and in random orientation;
and bonding said particles in said random arrangement under high pressure and elevated temperature with said more ductile material, whereby the composite article is substantially more ductile than said relatively brittle material.

19. The process of claim 18 wherein said thin layers of relatively brittle ceramic and said more ductile material each have a thickness of between about 10 microns and 2 mils.

20. The process of claim 18 wherein said thin layers of more ductile and relatively brittle ceramic material are generally parallel to each other.

21. The process of claim 18 wherein each of said particles has between about 10 to about 200 alternating layers of said relatively brittle ceramic and said more ductile material.

22. The process of claim 18 wherein said layers of relatively brittle ceramic material comprises between about 15% to about 85% of the total volume of said composite article.

23. The process of claim 18 wherein said particles are bonded in random orientation at temperatures of between about 600° C. to about 2000° C. and at pressures of between about 1000 p.s.i. and about 5000 p.s.i.

24. A process for making a composite article which consists essentially of:
depositing a multiplicity of thin layers of a ductile metal and a brittle metal material upon each other, in alternation, and bonding said layers of ductile and brittle material together to form a laminated body;
comminuting said laminated body into particles having a volume of less than about 1% of the volume of the composite article to be made, each of said particles retaining a plurality of laminations therein;
arranging said particles in closely spaced relationship, and in random orientation;
and bonding said particles in said random arrangement with said more ductile metal material under high pressure and elevated temperature, whereby the composite article is substantially more ductile than said relatively brittle material.

25. The process of claim 24 wherein said thin layers of ductile metal and brittle metal material each having a thickness of between about 10 microns ands 2 mils.

26. The process of claim 24 wherein said thin layers of ductile metal and brittle metal material are generally parallel to each other.

27. The process of claim 24 wherein each of said particles have between about 10 to about 200 alternating layers of said brittle metal and said ductile metal material.

28. The process of claim 24 wherein said layer of brittle metal material comprises between about 15% to about 85% of the total volume of said composite article.

29. The process of claim 24 wherein said particles are bonded in random orientation at temperatures of between about 600° C. to about 2000° C. and at pressures of between 1000 p.s.i. and 5000 p.s.i.

30. A process for making a composite ceramic-metal article which consists essentially of:
depositing a multiplicity of thin layers of a ductile metal and a brittle ceramic material upon each other, in alternation, and bonding said layers of ductile and brittle material together to form a laminated body;
comminuting said laminated body into particles having a volume of less than about 1% of the volume of the composite article to be made, each of said particles retaining a plurailty of laminations therein;
arranging said particles in closely spaced relationship, and in random orientation;
and bonding said particles in said random arrangement with said more ductile metal material under high pressure and elevated temperature, whereby the composite article is substantially more ductile than said relatively brittle material.

31. The process of claim 30 wherein said thin layers of ductile mtaal and brittle ceramic material each having a thickness of between about 10 microns and 2 mils.

32. The process of claim 30 wherein said thin layers of ductile metal and brittle ceramic material are generally parallel to each other.

33. The process of claim 30 wherein each of said particles have between about 10 to about 200 alternating layers of said brittle ceramic and said ductile metal material.

34. The process of claim 30 wherein said layer of brittle ceramic material comprises between about 15% to about 85% of the total volume of said composite article.

35. The process of claim 30 wherein said particles are bonded in random orientation at temperatures of between about 600° C. to about 2000° C. and at pressures of between 1000 p.s.i. and 5000 p.s.i.

36. The process of claim 30 wherein said particles have a mesh size of between about 4 mesh to 100 mesh.

37. The article of claim 8 wherein said plane of material composed of a ceramic material comprises between about 15% to about 85% of the total volume of said article.

References Cited

UNITED STATES PATENTS

| | | | |
|---|---|---|---|
| 3,047,409 | 7/1962 | Slayter | 75—206 X |
| 3,089,196 | 5/1963 | Knapp | 29—240 X |

CARL D. QUARFORTH, *Primary Examiner.*

L. DEWAYNE RUTLEDGE, *Examiner.*

A. J. STEINER, *Assistant Examiner.*